US012049860B2

(12) United States Patent
Lichtinger et al.

(10) Patent No.: US 12,049,860 B2
(45) Date of Patent: Jul. 30, 2024

(54) NOZZLE FOR A FUEL INJECTOR

(71) Applicant: LIEBHERR-COMPONENTS DEGGENDORF GMBH, Deggendorf (DE)

(72) Inventors: Klaus Lichtinger, Geiselhöring (DE); Thomas Atzkern, Augsburg (DE); Markus Hoellbacher, Oberalm (AT); Michael Schmid, Bischofsmais (DE)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 468 days.

(21) Appl. No.: 17/310,576

(22) PCT Filed: Feb. 11, 2020

(86) PCT No.: PCT/EP2020/053378
§ 371 (c)(1),
(2) Date: Aug. 11, 2021

(87) PCT Pub. No.: WO2020/165115
PCT Pub. Date: Aug. 20, 2020

(65) Prior Publication Data

US 2022/0065207 A1 Mar. 3, 2022

(30) Foreign Application Priority Data

Feb. 12, 2019 (DE) ..................... 10 2019 103 512.0

(51) Int. Cl.
*F02M 61/18* (2006.01)
*F02M 61/04* (2006.01)

(52) U.S. Cl.
CPC .......... *F02M 61/182* (2013.01); *F02M 61/04* (2013.01); *F02M 61/1893* (2013.01); *F02M 2200/46* (2013.01)

(58) Field of Classification Search
CPC .. F02M 61/182; F02M 61/04; F02M 61/1893; F02M 61/18; F02M 2200/46
(Continued)

(56) References Cited

U.S. PATENT DOCUMENTS 10,865,754 B2 * 12/2020 Lopez ................ F02M 61/1886
2012/0180757 A1 * 7/2012 Gerber ............... F02M 61/1866
123/294
(Continued)

FOREIGN PATENT DOCUMENTS

CN 105814305 A 7/2016
DE 19539798 A1 5/1996
(Continued)

OTHER PUBLICATIONS

ISA European Patent Office, International Search Report Issued in Application No. PCT/EP2020/053378, Apr. 17, 2019, WIPO, 4 pages.

(Continued)

*Primary Examiner* — Hai H Huynh
(74) *Attorney, Agent, or Firm* — McCoy Russell LLP

(57) ABSTRACT

A nozzle for a fuel injector the nozzle having a pivotably symmetrical nozzle member with a hollow space for introducing a nozzle needle, a nozzle tip at a longitudinal end of the nozzle member, at least one opening channel extending in a straight line for the discharge of fuel, and a nozzle needle arranged in the hollow space for selectively blocking an fuel inflow to the at least one opening channel. The nozzle is characterized in that the at least one opening channel has a center axis that is skewed with respect to the longitudinal axis of the nozzle member.

16 Claims, 6 Drawing Sheets

(58) Field of Classification Search
USPC .............................. 239/533.12; 123/468–470
See application file for complete search history.

(56) References Cited

U.S. PATENT DOCUMENTS

| | | | |
|---|---|---|---|
| 2013/0255622 | A1* | 10/2013 | Bandyopadhyay .......................... F02M 61/1806 123/294 |
| 2015/0285127 | A1 | 10/2015 | Abani et al. |
| 2018/0003131 | A1 | 1/2018 | Berger et al. |

FOREIGN PATENT DOCUMENTS

| | | | |
|---|---|---|---|
| DE | 10349778 | A1 | 6/2005 |
| DE | 102010040331 | A1 | 3/2012 |
| DE | 102013203271 | A1 | 8/2014 |
| DE | 112007000209 | B4 | 2/2015 |
| DE | 102015001199 | A1 | 8/2016 |
| DE | 102015211769 | A1 | 12/2016 |
| JP | 2004204806 | A | 7/2004 |
| JP | 2010255620 | A | 11/2010 |
| WO | 2014067723 | A1 | 5/2014 |

OTHER PUBLICATIONS

National Intellectual Property Administration of the People's Republic of China, Office Action and Search Report Issued in Application No. 202080014142.7, Mar. 31, 2023, 17 pages.

National Intellectual Property Administration of the People's Republic of China, Office Action and Search Report Issued in Application No. 202080014142.7, Dec. 29, 2023, 12 pages. (Submitted with Partial Translation).

* cited by examiner

NOZZLE FOR A FUEL INJECTOR

CROSS REFERENCE TO RELATED APPLICATIONS

The present application is a U.S. National Phase of International Application No. PCT/EP2020/053378 entitled "NOZZLE FOR A FUEL INJECTOR," and filed on Feb. 11, 2020. International Application No. PCT/EP2020/053378 claims priority to German Patent Application No. 10 2019 103 512.0 filed on Feb. 12, 2019. The entire contents of each of the above-listed applications are hereby incorporated by reference for all purposes.

TECHNICAL FIELD

The present disclosure relates to a nozzle for a fuel injector and to a fuel injector having such a nozzle.

BACKGROUND AND SUMMARY

Fuel injectors, that are also called injection nozzles, are an essential component of every internal combustion engine since the required quantity of the fuel to be combusted is introduced into the combustion chamber via them. It is of great importance for a clean combustion to maintain an opening and closing of the injector that is as fast as possible over the total service life of an injector to be able to continuously supply an exact quantity of a fuel.

Nozzles for fuel injectors are currently typically known whose openings for discharging highly pressurized fuel start radially from a so-called blind hole. The blind hole is a space that is arranged below the nozzle needle movable in the longitudinal direction and that is fluidically separable from a reservoir for highly pressurized fuel by the placing of the nozzle needle onto a seat region (cf. FIG. 7). If the nozzle needle is raised from the seat region of the nozzle member, fuel flows into the blind hole and from there via the openings out of the nozzle. The nozzle needle is here flowed around by fuel from the outside and flows in the direction of the openings.

It is now the aim of the present disclosure to improve the already known nozzles for fuel injectors or the fuel injectors themselves to achieve one or more of the following points such as optimization of the fuel flow (or the cavitation behavior), a weight reduction, a reduction of the harmful volume, an improvement of the hydraulic efficiency, an increase of the throughflow, a shortening of the injection hole length, an increase of the pressure resistance, a faster dethrottling, and an improved engine behavior (emission, consumption, . . . ).

The nozzle in accordance with the disclosure for a fuel injector accordingly comprises a pivotably symmetrical nozzle member having a hollow space for introducing a nozzle needle, a nozzle tip that is provided at a longitudinal end of the nozzle member, and at least one opening channel extending in a straight line for the discharge of fuel, and a nozzle needle arranged in the hollow space for the selective blocking of a fuel inflow to the at least one opening channel. The nozzle is characterized in that the at least one opening channel has a center axis that is skewed with respect to the longitudinal axis of the nozzle member.

A classic blind hole is therefore no longer formed in accordance with the solution in accordance with the disclosure. Injection holes are flowed to or filled directly without any flow deflection.

Due to the skewed arrangement of the center axis of the at least one opening channel, the outflowing fuel is deflected less strongly or less often with an open nozzle so that fewer flow losses arise and a nozzle is achieved that is more efficient overall. The deflection of the opening channels arranged radially to the longitudinal axis of the nozzle in accordance with the prior art can be dispensed with since its center axes are now skewed with respect to the longitudinal axis of the nozzle in accordance with the disclosure. Due to the skewed arrangement of the center axes of the opening channel with respect to the longitudinal axis, there is an offset between these axes that does not fall below a certain spacing level.

Provision can furthermore be made in accordance with the disclosure in this respect that the longitudinal axis of the nozzle member is identical to the pivot axis of the nozzle.

Provision can furthermore be made that a plurality of opening channels are provided of which each one has a center axis that is respectively skewed with respect to the longitudinal axis of the nozzle member and wherein each of the plurality of center axes is also skewed with respect to one another. As a rule, nozzles for fuel injectors have a plurality of opening channels to inject fuel in as homogeneous a manner as possible into a combustion space.

Provision may be made that inflow openings of the opening channels and squirt openings of the opening channels are each arranged on a circle that defines an inner surface that is perpendicular to the longitudinal axis of the nozzle member, wherein the inflow openings are arranged equidistantly from one another and/or the squirt openings are arranged equidistantly from one another. This arrangement has proved to be effective for a rapid outflow of fuel from the nozzle. The holes can also be disposed unequally from one another as part of the disclosure.

The circle on which the inflow openings are arranged can furthermore have a smaller diameter than the circle on which the squirt openings are arranged. It is thereby possible, for example, to achieve a greater jet angle for the dispensing of fuel with an unchanging thickness of the nozzle tip.

In accordance with an optional modification of the disclosure, the hollow space of the nozzle member tapers in funnel form in its end section facing the at least one opening channel and may have the jacket surface of a truncated cone standing on its head.

The end section can alternately also have a different shape, for example a cylindrical shape.

The hollow space for the reception of the nozzle needle is as a rule a blind hole or a blind bore that has the at least one opening channel at its tapered end. Provision can be made here that the hollow space comprises a cylindrical cutout which a funnel-like end section adjoins, for example in the form of a section tapering in a frustoconical manner.

Provision can additionally be made here that the funnel-like end section defines a circle at its tapered end to which an associated inflow opening of the at least one opening channel is adjacent. Provision can be made in accordance with the disclosure that the at least one opening channel starts within a surface defined by the circle. The at least one opening channel thus—unlike as frequently customary in the prior art—does not, for instance, start from the tapering funnel section or its jacket surface, but rather from the base section that is defined by the funnel section and that is surrounded by the circle at its tapered end.

In accordance with a further development of the disclosure, the funnel-like end section defines a circle at its tapered end whose inner surface is planar or whose inner surface rises in the direction of the hollow space.

The inner surface defined by the circle at the tapered end of the funnel-like end section can furthermore have a conical elevated portion, a cylindrical elevated portion, and/or a frustoconical elevated portion toward the hollow space that can have an axis of rotation that is identical to the longitudinal axis of the nozzle member. The space arranged between the base of the hollow space and the nozzle needle is thereby reduced so that the harmful volume defined by this space can be kept very low.

The nozzle needle may have a distal end contour that is adapted to the geometry of the distal end section of the nozzle member and may have a shape complementary thereto.

The harmful volume can thus be further reduced by a correspondingly shaped distal tip of the nozzle needle.

Provision is made in accordance with an optional modification of the disclosure that the nozzle needle has a frustoconically tapering end section whose angle of inclination, that is the angle of the jacket surface to the cone axis, is greater than that of the funnel-like end section of the nozzle member.

The tapered end section of such a nozzle needle can here advantageously have an indentation that has a shape complementary to the elevated portion at the base of the blind hole. If a cone that extends into the hollow space is present at the base of the blind hole, that is at the distal end of the hollow space, the nozzle needle can have a corresponding conical indentation at its distal end. The case is, however, also covered by the disclosure according to which the tapered end section of the nozzle needle is a planar surface that cooperates with a planar surface at the base of the blind hole.

The disclosure likewise comprises the idea according to which a space from which the at least one opening channel starts is provided beneath the nozzle needle between the nozzle needle and the nozzle member in a closed state of the nozzle in which the nozzle needle contacts the nozzle member at a seat surface.

Provision may be made that the center axes of the plurality of opening channels define a one sheet hyperboloid whose reference line is identical to the longitudinal axis of the nozzle member.

The angle of inclination of the opening channels, that is the angle of inclination of the generatrices of the one sheet hyperboloid, can here furthermore differ by less than 45°, or less than 25°, or less than 10°, or by less than 4°, from the complementary angle of the angle of inclination of the funnel-like end section of the nozzle member.

A frustoconical transition from the funnel-like end section into the opening channel is thereby produced that permits a flow of fuel out of the nozzle. It is thus namely ensured that the outflowing fuel does not have to be deflected again on entry into the opening channels, which is advantageous for the nozzle overall since there are fewer flow losses.

Provision can also be made that the two angles of inclination are selected such that every opening channel is aligned with the jacket surface of the funnel-like end section or such that the center axis of every opening channel is in parallel with the inclination of the funnel-like section. There is then no angle on the transition from the funnel-like end section into the opening channel since the respective surfaces are correspondingly aligned with one another. This may be advantageous when the at least one opening channel is adjacent to the jacket surface so that a fluid flowing at the jacket surface of the funnel-like section is introduced seamlessly into an opening channel while continuing the angle of inclination of the funnel-like section. There is thus no deflection of the fuel to be dispensed.

Provision can also be made in accordance with the disclosure in this respect that the hollow space is a blind hole, with a separate component, such as a sphere being arranged at the base of the blind hole to produce a structure projecting into the hollow space. The structure projecting into the hollow space can here represent the inner surface at the tapered end of the funnel-like end section. The base of the funnel-like end section is here created by the structure that extends in the direction of the hollow space.

The number of opening channels is here in the range from 2-16, for instance in the range from 4-12, and in the range from 6-8.

BRIEF DESCRIPTION OF THE FIGURES

The disclosure additionally relates to a fuel injector having a nozzle in accordance with one of the variants described above.

Further features, details of the disclosure will become clear with reference to the following description of the Figures. There are shown:

FIG. 5B: a plan view of the nozzle member of FIG. 5A with hidden elements showing through;

DETAILED DESCRIPTION

Figure 1A:
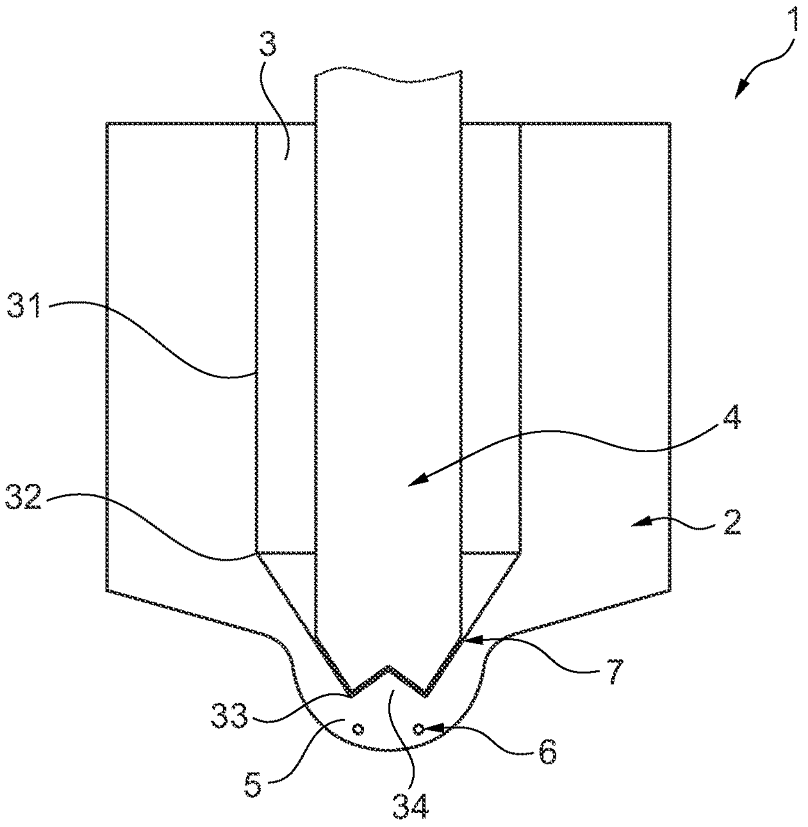
FIG. 1A: a sectional view along an axis A-A of FIG. 1B of the nozzle in accordance with an embodiment of the disclosure.
Figure 1B:
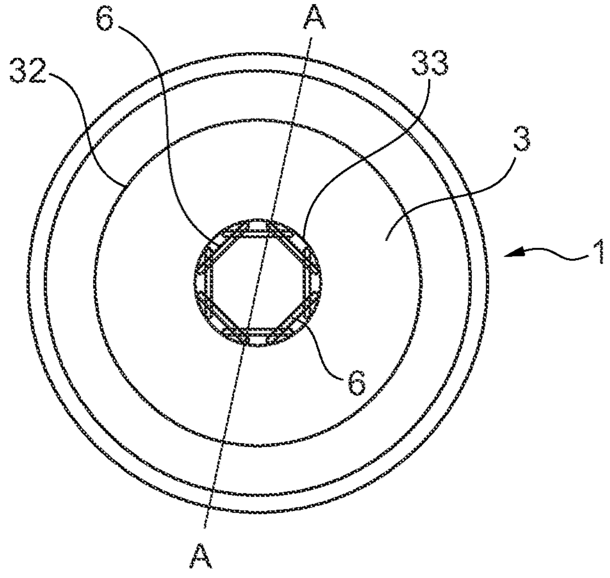
FIG. 1B: a plan view of the nozzle in accordance with the disclosure.

FIGS. 1A-B shows schematic views of the distal end region of a nozzle 1 in accordance with the disclosure. The nozzle member 2 can be recognized here that has a nozzle tip 5 at its distal end that has a plurality of opening channels 6 for discharging fuel (partially hidden). The nozzle member 2 here has a hollow space 3 for receiving a nozzle needle 4 that is movably received therein. The nozzle needle 4 can be moved along its longitudinal axis in accordance with the known principles for the raising and lowering of a nozzle needle 4 that are not restrictive for the present disclosure.

In a closed state of the nozzle 1, a tapering distal end section of the nozzle needle 4 lies on a seat surface 7 such that a fluid connection from an opening channel 6 arranged beneath the seat surface 7 to a space fillable with fuel above the seat surface 7 is interrupted. If the nozzle needle 4 contacts the seat surface 7 of the nozzle member, the nozzle 1 is in a closed state.

If, in contrast, the nozzle needle 4 is raised from the seat surface 7, there is an outflow of fuel from the opening channels 6.

It can furthermore be seen from FIG. 1A that the base of the blind hole-like hollow space 3 has a conical elevated portion 34 that projects into the hollow space 3 and that cooperates with a tip of the nozzle needle 4 shaped complementary thereto. The nozzle needle 4 has a W shape at its distal end in the section through the center axis of the nozzle 1 shown in FIG. 1A. The two outer strokes of the W shape here contact the seat surface 7, whereas the two inner strokes of the W shape cooperate with the conical elevated portion of the base of the blind hole.

The hollow space 3 of the nozzle member 2 has a cylindrical section 31 which the funnel-like end section 31 adjoins. The surface connecting the tapering end can adopt different designs in accordance with the disclosure.

FIG. 1B shows a plan view of the nozzle member of FIG. 1A in which hidden elements such as the opening channels 6 show through. It can be recognized that the opening channels 6 that extend in a straight line and that can be produced, for example, by bores, are skewed with respect to the longitudinal axis of the nozzle member 2. It can additionally be recognized that the inlet openings of the opening channels are adjacent to the jacket surface of a truncated cone 32, 33.

Figure 2A:
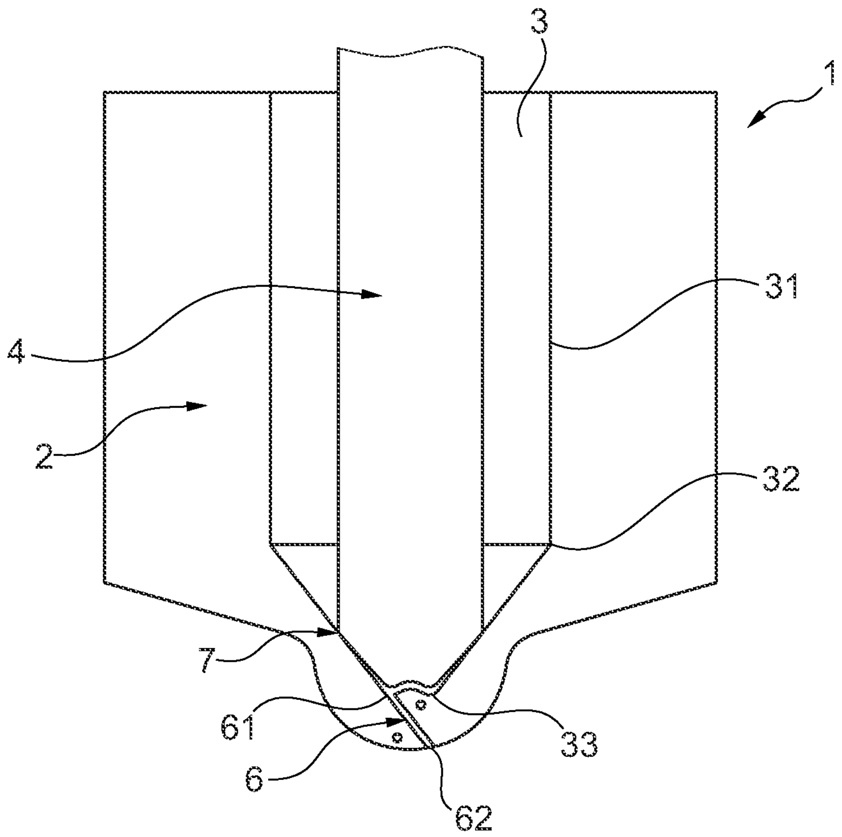
FIG. 2A: a sectional view along an axis B-B through the first embodiment of the nozzle as shown in FIG. 2B.

FIG. 2A is a second sectional view of the first embodiment of the disclosure. The sectional line B-B can here be seen from FIG. 2B that indicates a section along an opening passage 6.

It can thus be seen in FIG. 2A that the opening channel is arranged at the base of the blind hole or hollow space 3 directly adjacent to the jacket surface of the funnel-like end section 32, 33 at the same inclination as the funnel-like end section so that an outflowing fluid does not have to perform any deflection on the transition from the hollow space 3 into the opening channel 6.

An inflow opening into the opening channel 6 is characterized by the reference numeral 61, whereas the reference numeral 62 shows an outlet opening.

Figure 2B:
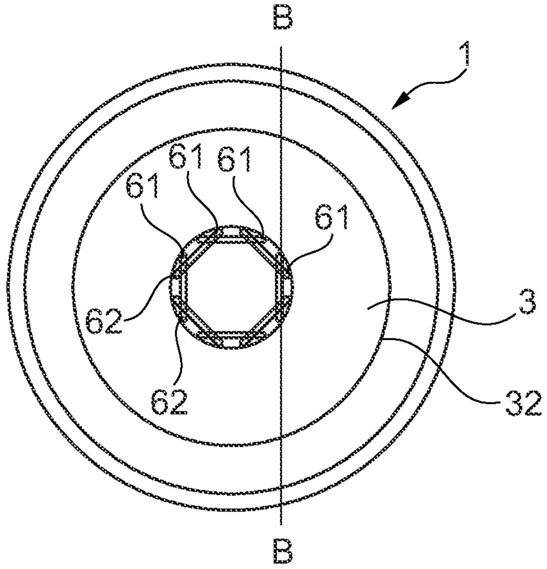
FIG. 2B: a plan view of an embodiment of the nozzle in accordance with the disclosure.

It can be seen from FIG. 2B that there is a total of eight different opening channels that are skewed both with respect to one another and with respect to the longitudinal axis of the nozzle.

In this respect, however, the inflow openings 61 and/or the outlet openings 62 of the respective opening channels 6 are all disposed on a circle 33.

Figure 3:
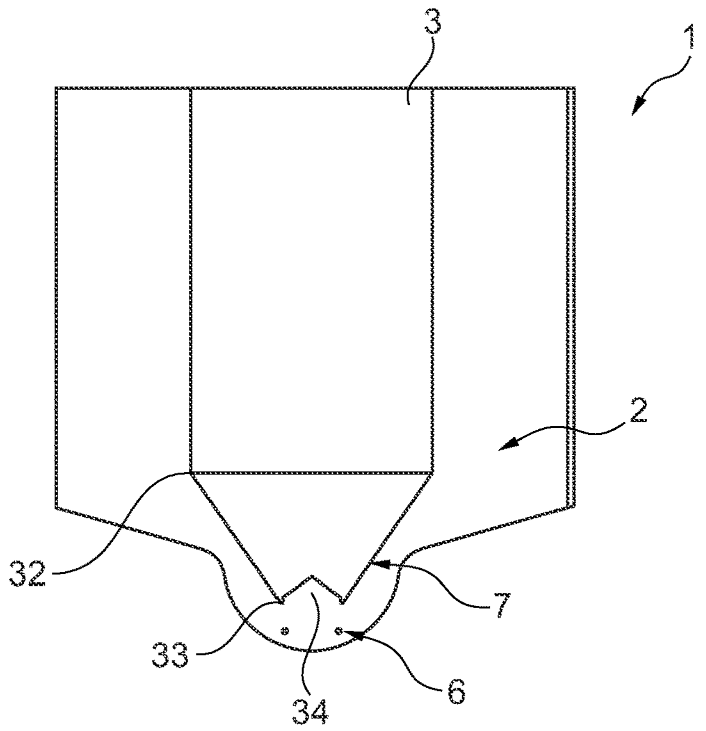
FIG. 3: a sectional view with hidden elements showing through of a second embodiment of the nozzle in accordance with the disclosure.

FIG. 3 shows a sectional view of the nozzle member 2 identical to that of FIG. 1A, with, in contrast to the preceding views, the hidden opening channels 6, that can actually not be seen in a sectional view, being shown for a better understanding of the disclosure.

Figure 4A:
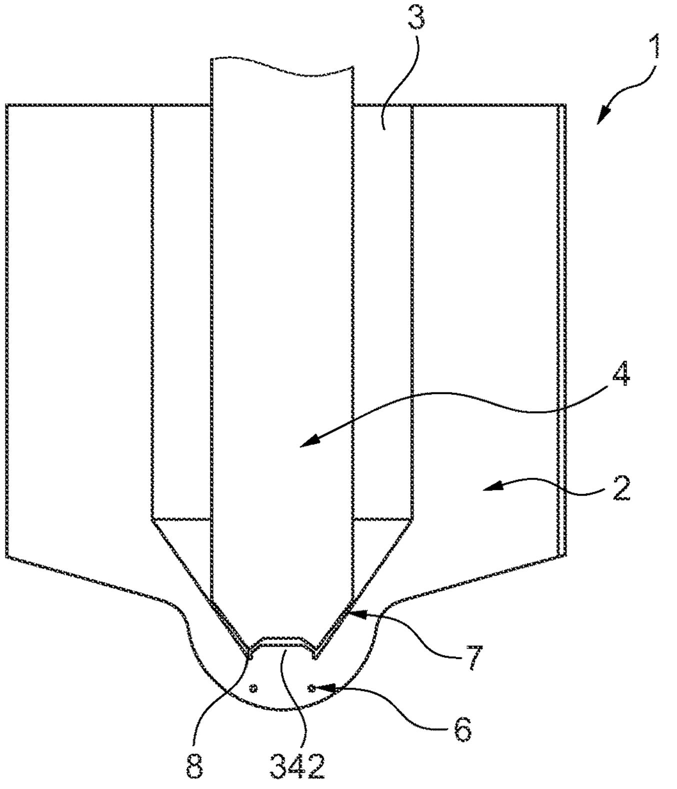
FIG. 4A: a sectional view with hidden elements showing through of a third embodiment of the nozzle in accordance with the disclosure.
Figure 4B:
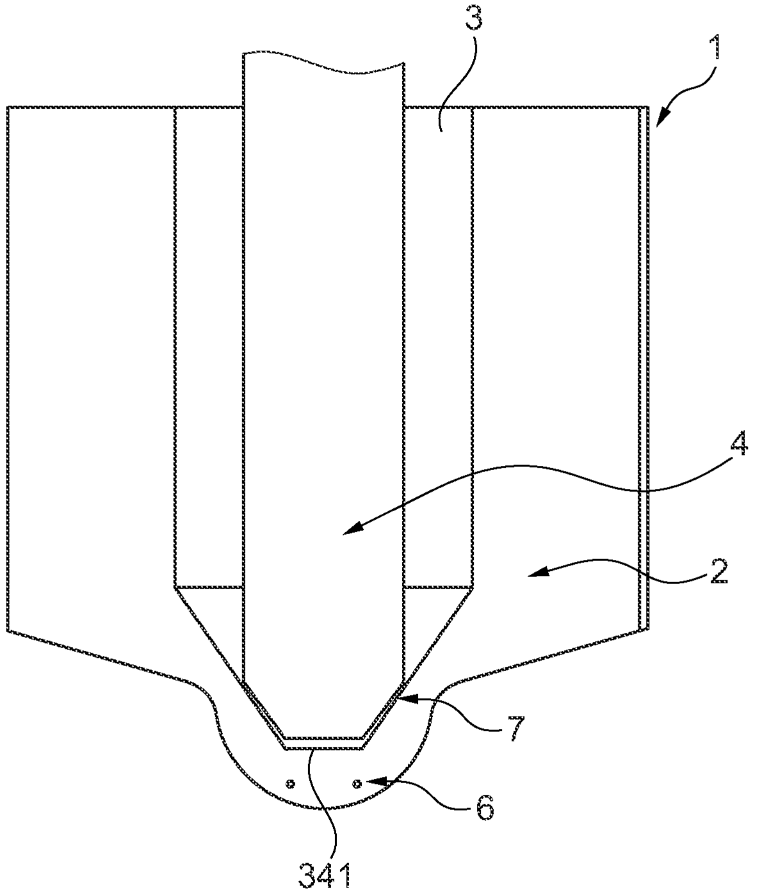
FIG. 4B: a sectional view with hidden elements showing through of a fourth embodiment of the nozzle in accordance with the disclosure.

FIGS. 4A and B show a further embodiment of the disclosure that, in contrast to the first embodiment shown in FIGS. 1 to 3, differs in its design of the distal tip section.

The base of the hollow space 3 or of the blind hole is now no longer provided with a conical elevated portion projecting into the hollow space 3, but rather adopts a design different therefrom. In the present case, the elevated portion is represented by a relatively flat truncated cone 342. The distal tip of the nozzle needle 4 also has a shape complementary thereto.

FIGS. 4A and B show a further embodiment of the disclosure that, in contrast to the preceding embodiments, differs in its design of the distal tip section.

The base of the hollow space 3 or of the blind hole is now no longer provided with a conical elevated portion projecting into the hollow space 3, but rather adopts a design different therefrom. In the present case, the elevated portion is formed by a flat plane 341. The distal tip of the nozzle needle 4 also has a shape complementary thereto and is now likewise planar. The hollow space 3 in this embodiment has a flat base.

Figure 5A:
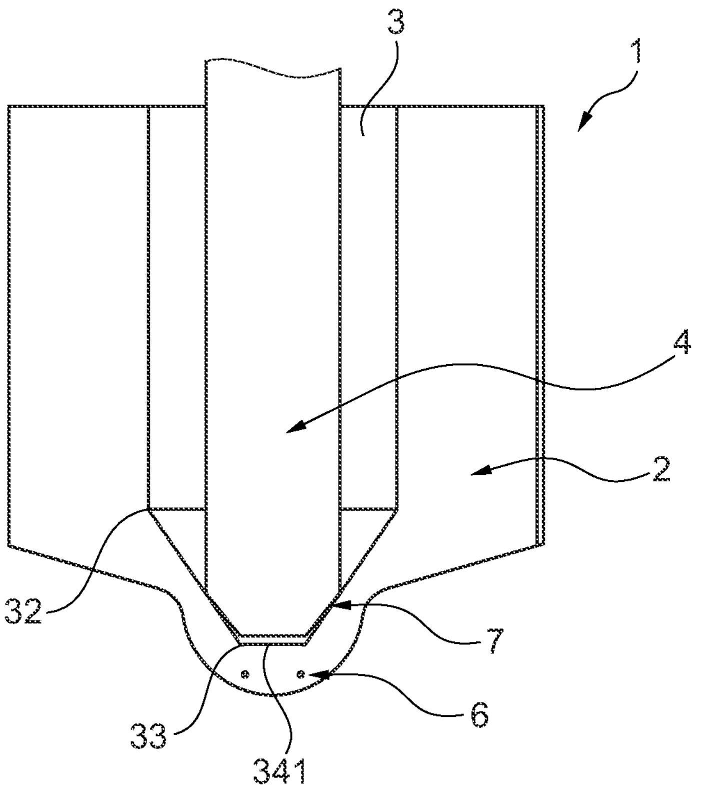
FIG. 5A: a sectional view through the center axis of the nozzle with hidden elements showing through a further embodiment of the nozzle in accordance with the disclosure.
Figure 5B:
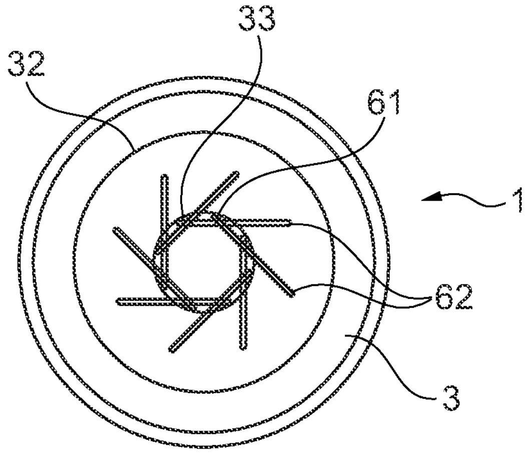

FIGS. 5A and 5B show a sectional view through the center axis of the nozzle or a plan view into the hollow body 3 of the nozzle member 2. The embodiment shown here corresponds to the previous embodiment, with a few modifications with respect to the opening channels.

It can be recognized that the outlet openings 62 of the opening channels 6 are arranged on a circle that has a greater radius than the circle on which the inflow openings 61 are arranged. It is thereby achieved that a larger jet angle is covered on discharging fuel into a combustion space.

Figure 6:
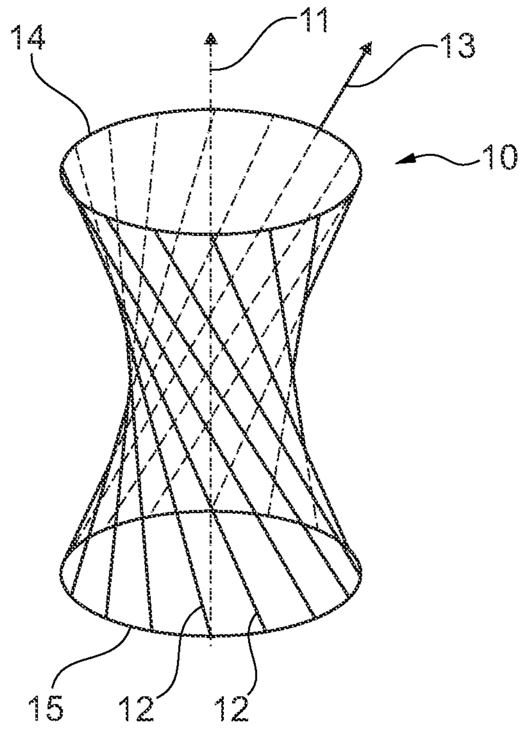
FIG. 6: a single sheet hyperboloid with the associated family of straight lines.

FIG. 6 shows a single sheet hyperboloid that is produced in that a straight line 12 skewed with respect to the reference line 11 is rotated about the reference line 11. The skewed straight lines 11 stand on a circular ring 14, 15 on a normal plane to the reference lines 11.

In the present disclosure, the arrangement of the straight-line opening channels with their respective center axes can adopt the shape of a single sheet hyperboloid. It is naturally not necessary here that the inlet and outlet openings of the opening channels are arranged on circles having the same diameters. They can, for example, be different as shown in FIG. 5A.

Figure 7:
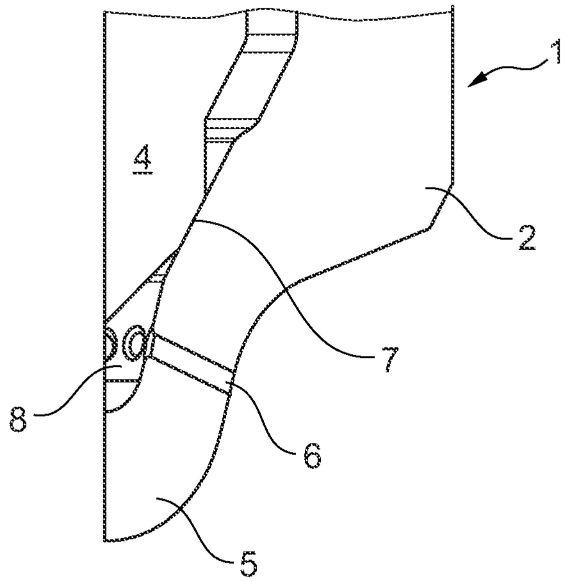
(Prior Art) FIG. 7
FIG. 7: a halved sectional view through a distal region of a fuel nozzle in accordance with the prior art.

FIG. 7 shows a nozzle 1 in its region of the tip in accordance with the prior art. The nozzle member 2 has a cutout 8 into which a nozzle needle 4 is introduced. This nozzle needle 4 is—unlike in accordance with the disclosure—not provided with a planar distal end section or even with an inwardly projecting arch.

A blind hole 12 from which the openings 6 start for the outlet of fuel from the nozzle 1 radially to the longitudinal axis of the nozzle 1 is provided beneath the seat surface 10. A multiple deflection of fuel is necessary due to this design, which promotes the occurrence of cavitation damage.

The invention claimed is:

1. A nozzle for a fuel injector comprising:

a pivotably symmetrical nozzle member having a hollow space for introducing a nozzle needle;

a nozzle tip at a longitudinal end of the nozzle member, wherein the nozzle member has a plurality of opening channels extending in a straight line for discharging fuel; and a nozzle needle arranged in the hollow space, wherein the nozzle needle is configured to selectively block a fuel supply to the plurality of opening channels, wherein each of the plurality of opening channels has a center axis that is skewed with respect to a longitudinal axis of the nozzle member and defines a one sheet hyperboloid.

2. The nozzle in accordance with claim 1, wherein each of the center axes of the plurality of opening channels is skewed with respect to one another.

3. The nozzle in accordance with claim 2, wherein inflow openings of the plurality of opening channels and squirt openings of the plurality of opening channels are each arranged on a circle that defines an inner surface that is perpendicular to the longitudinal axis of the nozzle member, and wherein the inflow openings are arranged equidistantly from one another and/or the squirt openings are arranged equidistantly from one another.

4. The nozzle in accordance with claim 3, wherein the circle on which the inflow openings are arranged has a smaller diameter than the circle on which the squirt openings are arranged.

5. The nozzle in accordance with claim 2, wherein the hollow space of the nozzle member tapers in a funnel form at an end section facing the at least one opening channel and has a jacket surface in a shape of a truncated cone standing on its head.

6. The nozzle in accordance with claim 5, wherein the funnel form end section defines a circle at the tapered end to which an associated inflow opening of the at least one opening channel is adjacent.

7. The nozzle in accordance with claim 5, wherein, the funnel form end section defines a circle at the tapered end whose inner surface is planar or whose inner surface rises in a direction of the hollow space.

8. The nozzle in accordance with claim 7, wherein the inner surface defined by the circle at the tapered end of the funnel form end section has a conical elevated portion, a cylindrical elevated portion, and/or a frustoconical elevated portion toward the hollow space has an axis of rotation that is identical to the longitudinal axis of the nozzle member.

9. The nozzle in accordance with claim 5, wherein the nozzle needle has a frustoconically tapering end section whose angle of inclination, that is an angle from the jacket surface to the cone axis, is greater than that of the funnel form end section of the nozzle member.

10. The nozzle in accordance with claim 9, wherein the center axes of the plurality of opening channels define the one sheet hyperboloid whose reference line is identical to the longitudinal axis of the nozzle member, and wherein the plurality of opening channels cross the longitudinal axis of the nozzle member at an angle relative to a radial direction.

11. The nozzle in accordance with claim 10, wherein the angle of inclination of the opening channels, that is the angle of inclination of all generatrices of the one sheet hyperboloid differs by less than 45°, or less than 25°, or less than 10°, or by less than 4°, from a complementary angle of the angle of inclination of the funnel form end section, that is the angle from the jacket surface to a conical axis.

12. The nozzle in accordance with claim 1, wherein the nozzle needle has a distal end contour that is adapted to a geometry of a distal end section of the nozzle member, and has a shape complementary thereto.

13. The nozzle in accordance with claim 1, wherein a space from which the at least one opening channel starts is provided beneath the nozzle needle between the nozzle needle and the nozzle member in a closed state of the nozzle in which the nozzle needle contacts the nozzle member at a seat surface.

14. The nozzle in accordance with claim 1, wherein the hollow space is a blind hole, with a separate component.

15. The nozzle in accordance with claim 14, wherein the separate component of the hollow space is a sphere arranged at a base of the blind hole to produce a structure projecting into the hollow space.

16. A fuel injector having a nozzle, wherein the nozzle comprises:

a pivotably symmetrical nozzle member having a hollow space for introducing a nozzle needle;

a nozzle tip at a longitudinal end of the nozzle member, wherein the nozzle member has a plurality of channel openings extending in a straight line for discharging fuel; and a nozzle needle arranged in the hollow space, wherein the nozzle needle is configured to selectively block a fuel supply to the plurality of channel openings, wherein the plurality of channel openings has a center axis that is skewed with respect to the longitudinal axis of the nozzle member and defines a one sheet hyperboloid.

* * * * *